2,899,744
CUTTING DEVICE

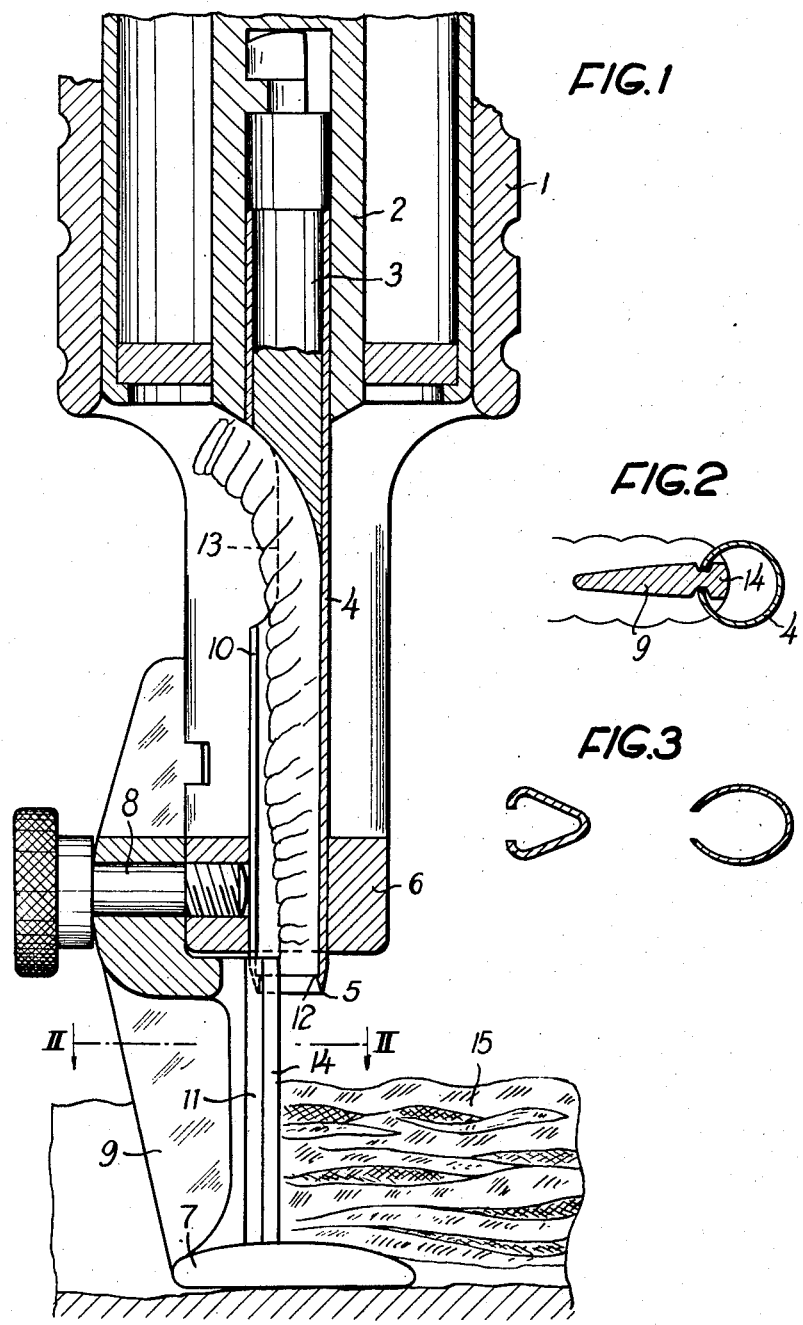

Gustaf Erik Björklund, Stockholm, and Svante Roland Edvardsson, Solna, Sweden, assignors to Aktiebolaget Dentatus, Hagersten, Sweden, a corporation of Sweden Application June 26, 1958, Serial No. 744,872

4 Claims. (Cl. 30—180)

This invention relates to cutting devices and particularly to hand cutting devices for cutting plaster bandages or similar materials and including a reciprocable member connected to a tool which alternatingly is driven into, and withdrawn from, the material while being fed transversely of the direction of the reciprocating movement. As a rule, the cutting device comprises a base member which in the cutting operation is slid under the material and which in cases where the cutting device is used for cutting plaster bandages prevents the bandage from exerting pressure upon the underlying part of the body of the patient. In conventional devices of this type the cutting tool consists of a knife the edge of which is located in or parallel to the plane in which a point of the tool moves during linear feed of the device. In such devices there is the risk that plaster or other material torn off during the cutting operation is pressed against the underlying part of the body, which may be very painful, especially if said part of the body is inflamed or swollen.

The object of the invention is to provide a cutting device which eliminates the above inconvenience. This object is attained by mechanism described with reference to the accompanying drawing in which—

Fig. 1 is a partly sectional view of the lower part of a hand cutting device including a tubular cutting tool according to the invention, and Fig. 2 a cross-sectional view along the line II—II of Fig. 1, the tool being moved down from the position shown in Fig. 1 into contact with the material to be cut out. Fig. 3 illustrates two modified cross-sectional shapes of the tool.

Referring to the drawing, reference numeral 1 denotes the casing of the hand cutting device which has a reciprocatable member 2 connected with a tool 3 which is secured to said member by means of a bayonet-joint. The lower part of the tool consists of a tube 4 having an edge 5 at its lower end. The tube passes through a bushing 6 connected with the casing. A base member 7 is connected with the bushing by means of a screw 8 and a web 9. The tube has a longitudinally extending slot the edges 10 of which are guided in grooves 11 provided on either side of the web 9. Inside the lower end of the tube there is provided a barb 12 such that the inner diameter of the tube at the edge is smaller than the diameter of the remaining part of the tube. At the slotted side of the tube there is provided an opening 13 between the edge and the fastened part of the tube. It will be seen from Fig. 2 that the web part 14 located beyond the grooves projects into the tube 4.

In operation of the hand cutting device, the base member 7 is slid under the plaster bandage 15. During the downward stroke of the tool 3, part of the material of the bandage will be cut out and will enter the tube 4. During the upward stroke of the tool, the material which has entered the tube is prevented, by means of the barb 12, from falling down into the hole formed in the material. Consequently, the tool can be fed transversely until the part 14 projecting into the tube 4 comes into contact with the wall of the hole, as shown in Fig. 2, whereupon a new part of the material is cut out during the downward stroke of the tool. It will be obvious that during each downward stroke of the material there will be cut out a part of the material which does not entirely fill up the interior of the tube, since the web part 14 projecting into the tube prevents the feed for each working stroke from becoming equal to the inner diameter of the tube 4. This fact in combination with the reduced inner diameter at the edge of the tube results in that the cut out material will not get packed in the tube, but will without obstruction leave the tube through the opening 13.

Due to the above described shape of the tool there is obtained a slot in the material, the contour of which is indicated in Fig. 2 and the width of which is greater than that obtained with conventional cutting devices. A further advantage consists in that the cutting direction may take sharp turns.

Fig. 3 illustrates two modified shapes of the tube 4. These shapes counteract to a still higher degree than a circular shape the tendency of the cut out material toward getting stuck in the tube.

Also in other respects, the form of construction described is to be considered as an example only which in practical design may be modified in various manners within the scope of the invention.

What is claimed is:

1. A cutting device for plaster bandages and similar materials, comprising a casing, a reciprocatable member in said casing, a longitudinally slotted tubular cutting tool having an edged mouth and being connected to said reciprocatable member and adapted to be alternatingly driven into, and withdrawn from, the material to be cut and to be fed transversely of the direction of its reciprocating movement, a base member adapted to be slid under said material, and a web connecting said base member to said casing and having grooves to guide the edges of the longitudinally extending slot.

2. A cutting device as set forth in claim 1, wherein a part of the grooved web extends into the tube, whereby to prevent the feed of the tool for each stroke from becoming so long as to cause the tube to be entirely filled with cut out material.

3. A cutting device as set forth in claim 1, wherein the cross-sectional area of the edged mouth of the tube is smaller than the cross-sectional area of the remaining part of the tube, whereby to facilitate removal of the cut out material.

4. A cutting device as set forth in claim 1 and further comprising a barb member at the inside of the edged mouth of the tube, said barb member being constructed to prevent cut out material from falling back into the groove cut out by the tool in the material.

No references cited.